United States Patent
Tu et al.

(10) Patent No.: US 9,063,622 B2
(45) Date of Patent: Jun. 23, 2015

(54) TOUCH MODULE HAVING A DYNAMIC CAPACITANCE MATCHING MECHANISM

(75) Inventors: Yen-Hung Tu, Taipei (TW); Chung-Lin Chia, Taipei (TW); Han-Chang Chen, Taipei (TW)

(73) Assignee: Yen-Hung Tu, Taipei (TW)

( * ) Notice: Subject to any disclaimer, the term of this patent is extended or adjusted under 35 U.S.C. 154(b) by 274 days.

(21) Appl. No.: 13/618,972

(22) Filed: Sep. 14, 2012

(65) Prior Publication Data

US 2014/0015549 A1      Jan. 16, 2014

(30) Foreign Application Priority Data

Jul. 12, 2012  (TW) .............................. 101125044 A

(51) Int. Cl.
| | | |
|---|---|---|
| *G01R 27/26* | (2006.01) | |
| *G06F 3/044* | (2006.01) | |
| *G06F 3/041* | (2006.01) | |

(52) U.S. Cl.
CPC .............. *G06F 3/044* (2013.01); *G06F 3/0416* (2013.01)

(58) Field of Classification Search
CPC ..... G06F 3/044; G06F 1/3203; G06F 1/3262; G06F 3/0416; G01D 5/24; G01R 27/2605
USPC ......... 324/658, 672, 676, 678, 686, 660, 613, 324/679, 661, 609, 750.3; 345/173, 174, 345/143, 144, 156, 212
See application file for complete search history.

(56) References Cited

U.S. PATENT DOCUMENTS

| | | | | |
|---|---|---|---|---|
| 6,597,238 | B1* | 7/2003 | Matsumoto et al. .......... | 329/300 |
| 6,744,258 | B2* | 6/2004 | Ishio et al. .................... | 324/548 |
| 2004/0004488 | A1* | 1/2004 | Baxter ........................... | 324/678 |
| 2007/0268272 | A1* | 11/2007 | Perski et al. ................... | 345/173 |
| 2008/0007534 | A1* | 1/2008 | Peng et al. ..................... | 345/173 |
| 2009/0167718 | A1* | 7/2009 | Lee et al. ....................... | 345/174 |
| 2011/0122089 | A1* | 5/2011 | Kobayashi et al. ........... | 345/174 |
| 2011/0273193 | A1* | 11/2011 | Huang et al. .................. | 324/678 |
| 2011/0279131 | A1* | 11/2011 | Kim et al. ...................... | 324/679 |

* cited by examiner

*Primary Examiner* — Arleen M Vazquez
*Assistant Examiner* — Neel Shah
(74) *Attorney, Agent, or Firm* — Tracy M Heims; Apex Juris, Pllc

(57) ABSTRACT

A touch module having a dynamic capacitance matching mechanism, including: a comparator, having a first input end and a second input end, the second input end being coupled with a reference voltage; a touch capacitive circuit, having a variable touch capacitor, a voltage source, and a second output end, wherein the voltage source is used to perform a charging procedure on the variable touch capacitor, and the variable touch capacitor is coupled to the first input end of the comparator via the second output end after the charging procedure; and a transferred-charge-storing capacitive circuit, having a variable transferred-charge-storing capacitor and a third output end, wherein the variable transferred-charge-storing capacitor is used to couple with the first input end of the comparator via the third output end to perform a charge transfer procedure.

16 Claims, 6 Drawing Sheets

TOUCH MODULE HAVING A DYNAMIC CAPACITANCE MATCHING MECHANISM

BACKGROUND OF THE INVENTION

1. Field of the Invention

The present invention relates to a touch module, especially to a touch module having a dynamic capacitance matching mechanism.

2. Description of the Related Art

Please refer to FIG. 1, which illustrates a touch detection circuit of a prior art capacitive touch module. As illustrated in FIG. 1, the touch detection circuit includes a comparator 100, a touch sensing electrode 110, a transferred-charge-storing capacitor 120, and a reset switch 130.

The comparator 100 has a first input end, a second input end, and an output end. The first input end is used to couple with the touch sensing electrode 110, the transferred-charge-storing capacitor 120, and the reset switch 130; the second input end is coupled with a reference voltage $V_{th}$; and the output end is used to provide an output signal $V_{out}$.

The touch sensing electrode 110 has a first capacitance. When a finger touches the touch sensing electrode 110, the touch sensing electrode 110 will exhibit a second capacitance, wherein the second capacitance is larger than the first capacitance. During a period when the touch sensing electrode 110 is connected with a DC voltage $V_{DD}$, the quantity of charge accumulated on the touch sensing electrode 110 will be larger with the touch sensing electrode 110 exhibiting the second capacitance than with the touch sensing electrode 110 having the first capacitance.

The transferred-charge-storing capacitor 120, having a capacitance much larger than the first capacitance or the second capacitance, is used to receive charge transferred from the touch sensing electrode 110.

The reset switch 130 is used to clear the charge on the transferred-charge-storing capacitor 120 after the voltage on the transferred-charge-storing capacitor 120 reaches the reference voltage $V_{th}$.

Please refer to FIG. 2(a)-2(c), which illustrate an operation procedure of the circuit in FIG. 1. FIG. 2(a) illustrates a charging stage, where a DC voltage $V_{DD}$ is used to charge an equivalent capacitor of the touch sensing electrode 110. FIG. 2(b) illustrates a charge transfer stage, where the touch sensing electrode 110 is connected with the transferred-charge-storing capacitor 120 to form a loop to transfer charge from the touch sensing electrode 110 to the transferred-charge-storing capacitor 120.

FIG. 3 illustrates a waveform diagram of a voltage $V_A$ on the transferred-charge-storing capacitor 120, and the output signal $V_{OUT}$ of the comparator 100. As illustrated in FIG. 3, the time for $V_A$ to reach $V_{th}$ is longer when no touch event occurs than when a touch event takes place.

However, when the area of the touch sensing electrode 110 needs to change dynamically to increase sensing efficiency, the structure of FIG. 1 can cause touch detection errors. For example, when the area of the touch sensing electrode 110 is corresponding to a touch plane to serve as a switch, the structure of FIG. 1 can falsely determine a touch event is happening even though no touch event is actually taking place—the reason is that the time for $V_A$ to reach $V_{th}$ will be greatly reduced in this scenario to cause a false touch detection.

To solve the foregoing problems, a touch module having a dynamic capacitance matching mechanism is needed.

SUMMARY OF THE INVENTION

One objective of the present invention is to disclose a touch module having a dynamic capacitance matching mechanism, which can dynamically configure an effective area for a touch sensing electrode, and a corresponding capacitance of a transferred-charge-storing capacitor, to increase sensing efficiency and avoid false touch detections.

Another objective of the present invention is to disclose a touch module having a dynamic capacitance matching mechanism, which can dynamically configure an effective area for a touch sensing electrode, and a corresponding voltage value of a charging power source, to increase sensing efficiency and avoid false touch detections.

Another objective of the present invention is to disclose a touch module having a dynamic capacitance matching mechanism, which can dynamically configure an effective area for a touch sensing electrode, and a corresponding voltage value of a reference voltage, to increase sensing efficiency and avoid false touch detections.

Another objective of the present invention is to disclose a touch module having a dynamic capacitance matching mechanism, which can dynamically configure an effective area for a touch sensing electrode to increase noise immunity of the touch module.

Still another objective of the present invention is to disclose a touch module having a dynamic capacitance matching mechanism, which can dynamically configure an effective area for a touch sensing electrode to overcome an interference on the touch module caused by a display signal.

To attain the foregoing objectives, the present invention proposes a touch module having a dynamic capacitance matching mechanism, the touch module including:

a comparator, having a first input end, a second input end, and an output end, wherein the second input end is coupled with a reference voltage;

a touch capacitive circuit, having a variable touch capacitor, a voltage source, and a second output end, wherein the voltage source is used to perform a charging procedure on the variable touch capacitor, and the variable touch capacitor is coupled to the first input end of the comparator via the second output end after the charging procedure;

a transferred-charge-storing capacitive circuit, having a variable transferred-charge-storing capacitor, and a third output end, wherein the variable transferred-charge-storing capacitor is used to couple with the first input end of the comparator via the third output end to perform a charge transfer procedure, and the capacitance value of the variable transferred-charge-storing capacitor is determined according to the capacitance value of the variable touch capacitor; and a reset switch, coupled between the first input end and a reference ground for performing a discharging procedure on the variable transferred-charge-storing capacitor.

In one embodiment, the touch module having a dynamic capacitance matching mechanism further includes a control unit to dynamically configure a capacitance value of the variable touch capacitor, and a corresponding capacitance value of the variable transferred-charge-storing capacitor.

In one embodiment, the variable touch capacitor is formed by a subset of a plurality of capacitors included in a touch capacitor array.

In one embodiment, the touch capacitor array is a capacitor array selected from a group consisting of a self capacitor array, a mutual capacitor array, and any combinations thereof.

In one embodiment, the variable transferred-charge-storing capacitor is implemented by a capacitor selected from a group consisting of a plurality of capacitors of different capacitance values.

In one embodiment, the variable transferred-charge-storing capacitor is located in an integrated circuit.

In one embodiment, the variable transferred-charge-storing capacitor is located on a printed circuit board.

To attain the foregoing objectives, another touch module having a dynamic capacitance matching mechanism is proposed, the touch module including:

a comparator, having a first input end, a second input end, and an output end, wherein the second input end is coupled with a variable reference voltage;

a touch capacitive circuit, including a variable touch capacitor, a voltage source, and a second output end, wherein the voltage source is used to perform a charging procedure on the variable touch capacitor, and the variable touch capacitor is coupled with the first input end of the comparator via the second output end after the charging procedure, wherein the variable touch capacitor is formed by a subset of a plurality of capacitors included in a touch capacitor array;

a transferred-charge-storing capacitive circuit, including a variable transferred-charge-storing capacitor and a third output end, wherein the variable transferred-charge-storing capacitor is used to couple the first input end of the comparator via the third output end to perform a charge transfer procedure, and the variable transferred-charge-storing capacitor is implemented with a capacitor selected from a group consisting of a plurality of capacitors of different capacitance values, and the capacitance value of the variable transferred-charge-storing capacitor is determined according to the capacitance value of the variable touch capacitor; and a reset switch, coupled between the first input end and a reference ground for performing a discharging procedure on the variable transferred-charge-storing capacitor.

In one embodiment, the touch module having a dynamic capacitance matching mechanism further includes a control unit for dynamically configuring the capacitance value of the variable touch capacitor, and a corresponding capacitance value of the variable transferred-charge-storing capacitor.

In one embodiment, the control unit further has a function of dynamically determining the voltage value of the variable reference voltage.

In one embodiment, the touch capacitor array is a capacitor array selected from a group consisting of a self capacitor array, a mutual capacitor array, and any combinations thereof.

In one embodiment, the variable transferred-charge-storing capacitor is located in an integrated circuit.

In one embodiment, the variable transferred-charge-storing capacitor is located on a printed circuit board.

To attain the foregoing objectives, still another touch module having a dynamic capacitance matching mechanism is proposed, the touch module including:

a comparator, having a first input end, a second input end, and an output end, wherein the second input end is coupled with a variable reference voltage;

a touch capacitive circuit, including a variable touch capacitor, a variable voltage source, and a second output end, wherein the variable voltage source is used to perform a charging procedure on the variable touch capacitor, and the variable touch capacitor is coupled with the first input end of the comparator via the second output end after the charging procedure, wherein the variable touch capacitor is formed by a subset of a plurality of capacitors included in a touch capacitor array;

a transferred-charge-storing capacitive circuit, including a variable transferred-charge-storing capacitor and a third output end, wherein the variable transferred-charge-storing capacitor is used to couple the first input end of the comparator via the third output end to perform a charge transfer procedure, and the variable transferred-charge-storing capacitor is implemented with a capacitor selected from a group consisting of a plurality of capacitors of different capacitance values;

a reset switch, coupled between the first input end and a reference ground for performing a discharging procedure on the variable transferred-charge-storing capacitor; and a control unit, used to dynamically configure the capacitance value of the variable touch capacitor, and a corresponding capacitance value of the variable transferred-charge-storing capacitor.

In one embodiment, the control unit further has a function of dynamically determining the voltage value of the variable reference voltage and the voltage value of the variable voltage source.

In one embodiment, the variable transferred-charge-storing capacitor is located in an integrated circuit or on a printed circuit board.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 1:
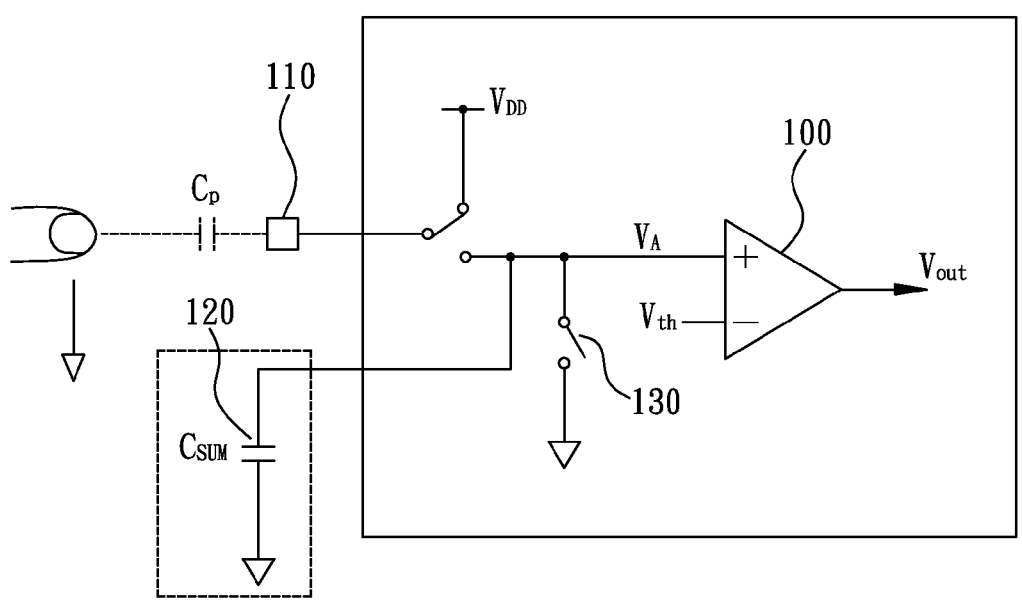
FIG. 1 illustrates a touch detection circuit of a prior art capacitive touch module.
Figure 2A:
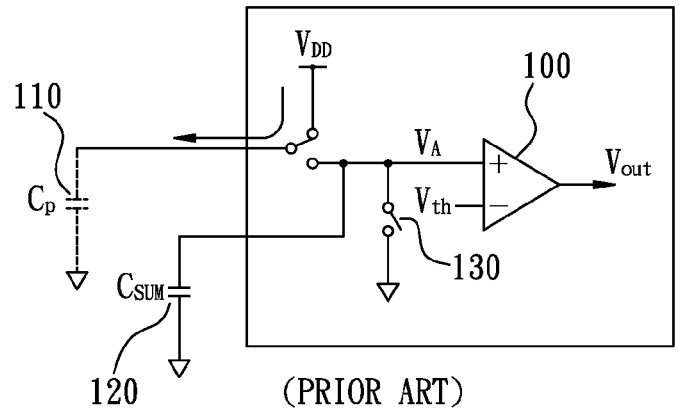
FIG. 2(a)-2(c) illustrate an operation procedure of the circuit in FIG. 1.
Figure 2B:
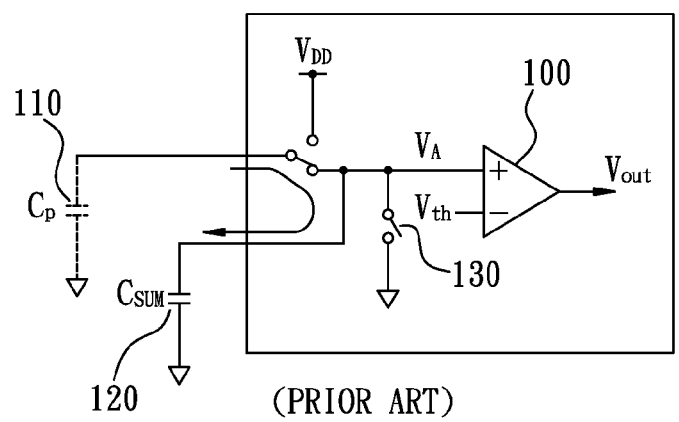
Figure 2C:
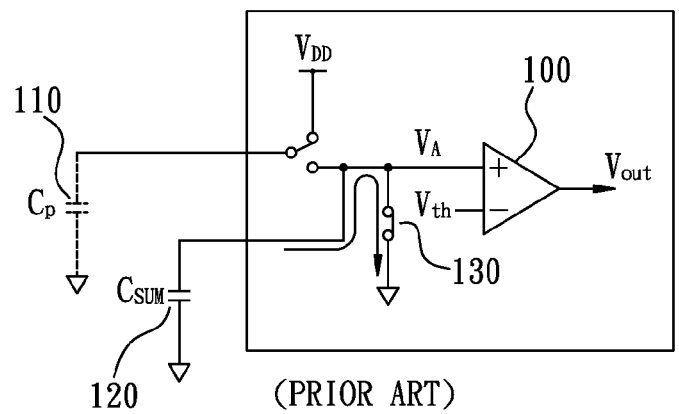
Figure 3:
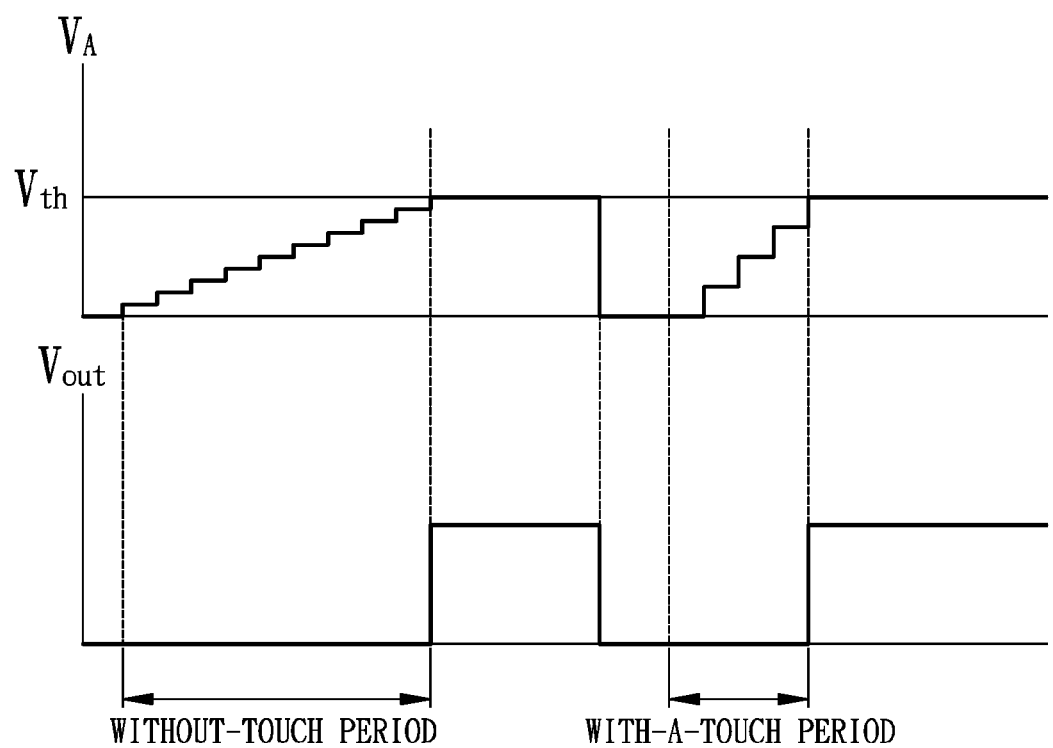
FIG. 3 illustrates a waveform diagram of a voltage $V_A$ on a transferred-charge-storing capacitor in FIG. 1, and an output signal $V_{OUT}$ of a comparator in FIG. 1.
Figure 4:
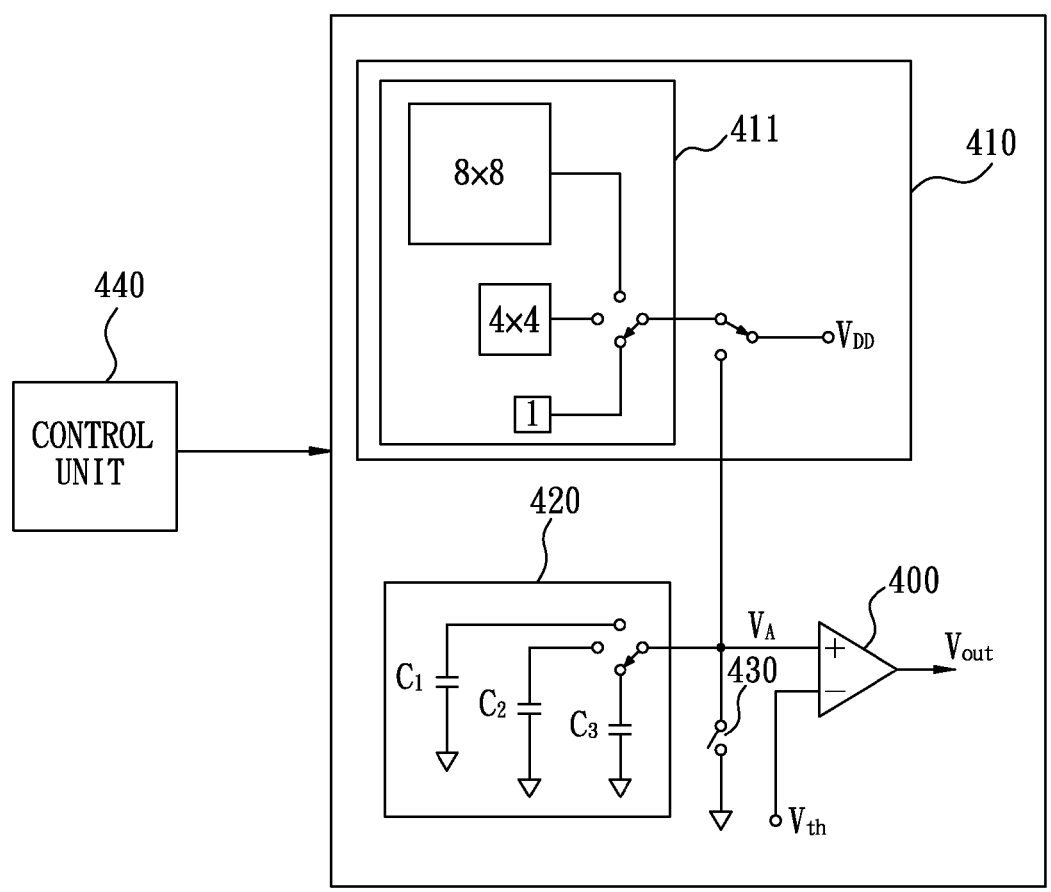
FIG. 4 illustrates a block diagram of a touch module having a dynamic capacitance matching mechanism according to a preferred embodiment of the present invention.

Please refer to FIG. 4, which illustrates a block diagram of a touch module having a dynamic capacitance matching mechanism according to a preferred embodiment of the present invention. As illustrated in FIG. 4, the touch module having a dynamic capacitance matching mechanism includes a comparator 400, a touch capacitive circuit 410, a transferred-charge-storing capacitive circuit 420, a reset switch 430, and a control unit 440.

The comparator 400 has a first input end, a second input end, and a first output end, wherein the second input end is coupled with a reference voltage $V_{th}$.

The touch capacitive circuit 410 includes a variable touch capacitor 411, a voltage source $V_{DD}$, and a second output end, wherein the voltage source $V_{DD}$ is used to perform a charging procedure on the variable touch capacitor 411, and the variable touch capacitor 411 is coupled with the first input end of the comparator 400 via the second output end after the charging procedure. The variable touch capacitor 411 is formed by a subset of a plurality of capacitors included in a touch capacitor array—for example, a subset having 8×8 electrodes, 4×4 electrodes, or a single electrode.

The touch capacitor array is a capacitor array selected from a group consisting of a self capacitor array, a mutual capacitor array, and any combinations thereof.

The transferred-charge-storing capacitive circuit 420 includes a variable transferred-charge-storing capacitor and a third output end, wherein the variable transferred-charge-storing capacitor is used to couple the first input end of the comparator 400 via the third output end to perform a charge transfer procedure, wherein the capacitance value of the variable transferred-charge-storing capacitor is determined according to the capacitance value of the variable touch capacitor 411. The variable transferred-charge-storing capacitor is implemented with a capacitor selected from a group consisting of a plurality of capacitors of different capacitance values—for example but not limited to C1, C2, and C3 as illustrated in FIG. 4, with C1>C2>C3. The variable transferred-charge-storing capacitor can be located in an integrated circuit or on a printed circuit board.

The reset switch 430 is coupled between the first input end and a reference ground for performing a discharging procedure on the variable transferred-charge-storing capacitor.

The control unit 440 is used to dynamically configure the capacitance value of the variable touch capacitor 411, and a corresponding capacitance value of the variable transferred-charge-storing capacitor. For example, C1 corresponds to 8×8 electrodes, C2 corresponds to 4×4 electrodes, and C3 corresponds to a single electrode.

Based on the design mentioned above, the touch module having a dynamic capacitance matching mechanism of the present invention can therefore dynamically configure an effective area for a touch sensing electrode, and a corresponding capacitance value of a transferred-charge-storing capacitor, to improve sensing efficiency, avoid wasting power, prevent touch detection errors, and increase noise immunity of the touch module to overcome an interference on the touch module caused by a display signal.

Figure 5:
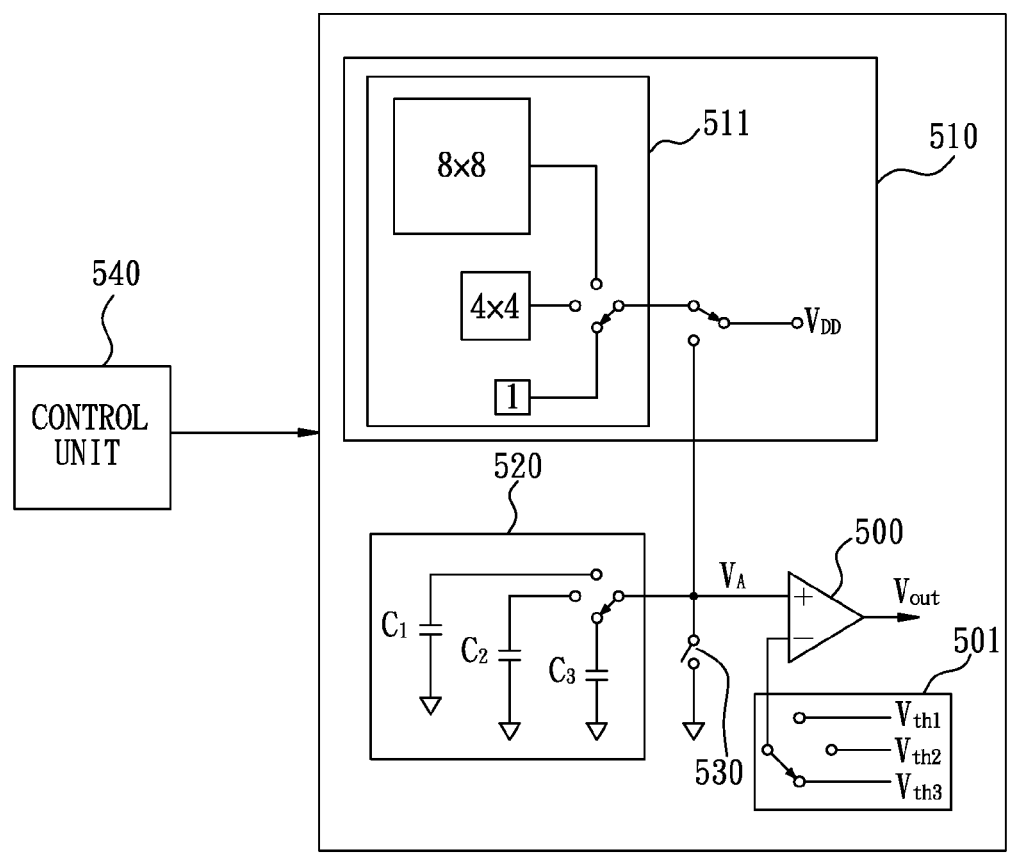
FIG. 5 illustrates a block diagram of a touch module having a dynamic capacitance matching mechanism according to another preferred embodiment of the present invention.

Please refer to FIG. 5, which illustrates a block diagram of a touch module having a dynamic capacitance matching mechanism according to another preferred embodiment of the present invention. As illustrated in FIG. 5, the touch module having a dynamic capacitance matching mechanism includes a comparator 500, a touch capacitive circuit 510, a transferred-charge-storing capacitive circuit 520, a reset switch 530, and a control unit 540.

The comparator 500 has a first input end, a second input end, and a first output end, wherein the second input end is coupled with a variable reference voltage 501, which can be for example but not limited to $V_{th1}$, $V_{th2}$, or $V_{th3}$, with $V_{th1}>V_{th2}>V_{th3}$.

The touch capacitive circuit 510 includes a variable touch capacitor 511, a voltage source $V_{DD}$, and a second output end, wherein the voltage source $V_{DD}$ is used to perform a charging procedure on the variable touch capacitor 511, and the variable touch capacitor 511 is coupled with the first input end of the comparator 500 via the second output end after the charging procedure. The variable touch capacitor 511 is formed by a subset of a plurality of capacitors included in a touch capacitor array—for example, a subset having 8×8 electrodes, 4×4 electrodes, or a single electrode. The touch capacitor array is a capacitor array selected from a group consisting of a self capacitor array, a mutual capacitor array, and any combinations thereof.

The transferred-charge-storing capacitive circuit 520 includes a variable transferred-charge-storing capacitor and a third output end, wherein the variable transferred-charge-storing capacitor is used to couple the first input end of the comparator 500 via the third output end to perform a charge transfer procedure, wherein the variable transferred-charge-storing capacitor is implemented with a capacitor selected from a group consisting of a plurality of capacitors of different capacitance values—for example but not limited to C1, C2, and C3 as illustrated in FIG. 5 with C1>C2>C3, and the capacitance value of the variable transferred-charge-storing capacitor is determined according to the capacitance value of the variable touch capacitor 511. The variable transferred-charge-storing capacitor can be located in an integrated circuit or on a printed circuit board.

The reset switch 530 is coupled between the first input end and a reference ground for performing a discharging procedure on the variable transferred-charge-storing capacitor.

The control unit 540 is used to dynamically configure the capacitance value of the variable touch capacitor 511, a corresponding capacitance value of the variable transferred-charge-storing capacitor, and a corresponding voltage value of the variable reference voltage 501. For example, C1 corresponds to 8×8 electrodes, C2 corresponds to 4×4 electrodes, and C3 corresponds to a single electrode; and $V_{th1}$ corresponds to 8×8 electrodes, $V_{th2}$ corresponds to 4×4 electrodes, and $V_{th3}$ corresponds to a single electrode.

Based on the design mentioned above, the touch module having a dynamic capacitance matching mechanism of the present invention can therefore dynamically configure an effective area for a touch sensing electrode, a corresponding capacitance value of a transferred-charge-storing capacitor, and a corresponding voltage value of a variable reference voltage to improve sensing efficiency, avoid wasting power, prevent touch detection errors, and increase noise immunity of the touch module to overcome an interference on the touch module caused by a display signal.

Figure 6:
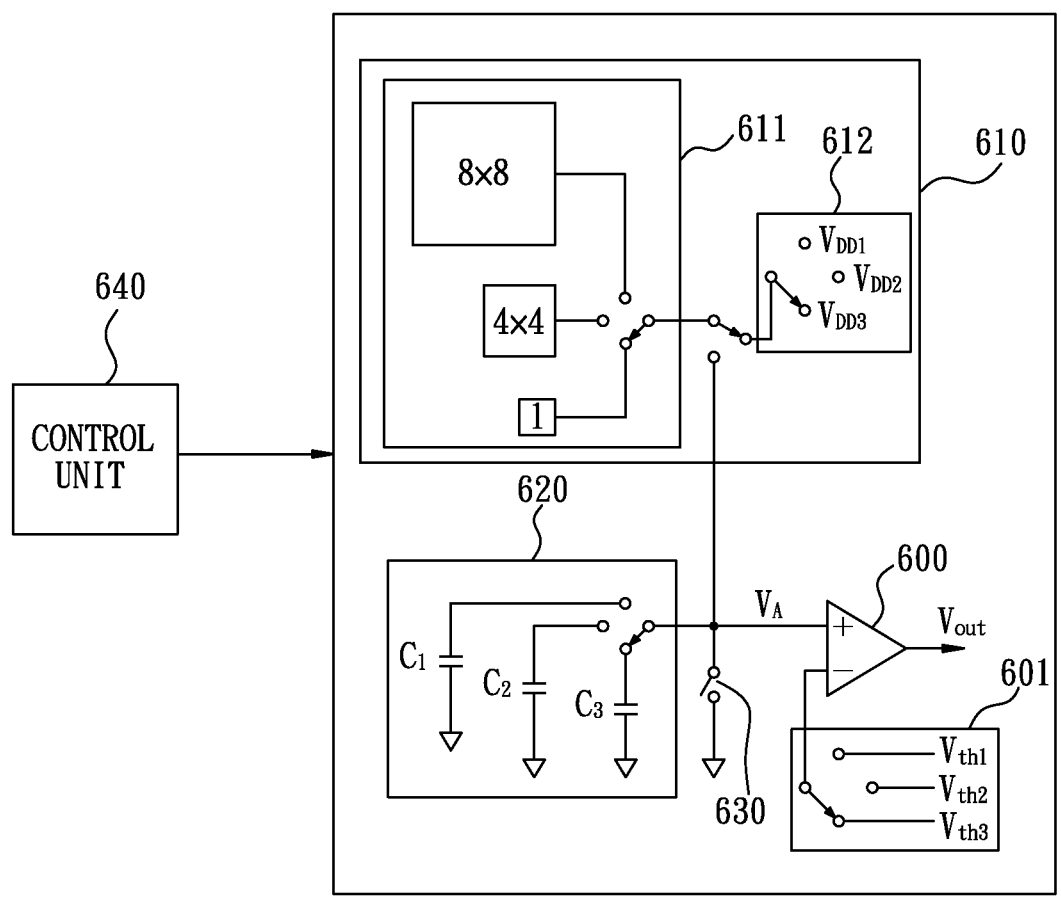
FIG. 6 illustrates a block diagram of a touch module having a dynamic capacitance matching mechanism according to still another preferred embodiment of the present invention.

Please refer to FIG. 6, which illustrates a block diagram of a touch module having a dynamic capacitance matching mechanism according to still another preferred embodiment of the present invention. As illustrated in FIG. 6, the touch module having a dynamic capacitance matching mechanism includes a comparator 600, a touch capacitive circuit 610, a transferred-charge-storing capacitive circuit 620, a reset switch 630, and a control unit 640.

The comparator 600 has a first input end, a second input end, and a first output end, wherein the second input end is coupled with a variable reference voltage 601, which can be for example but not limited to $V_{th1}$, $V_{th2}$, or $V_{th3}$, with $V_{th1}>V_{th2}>V_{th3}$.

The touch capacitive circuit 610 includes a variable touch capacitor 611, a variable voltage source 612, and a second output end, wherein the variable voltage source 612 is used to perform a charging procedure on the variable touch capacitor 611, and the variable touch capacitor 611 is coupled with the first input end of the comparator 600 via the second output end after the charging procedure. The variable touch capacitor 611 is formed by a subset of a plurality of capacitors included in a touch capacitor array—for example, a subset having 8×8 electrodes, 4×4 electrodes, or a single electrode. The touch capacitor array is a capacitor array selected from a group consisting of a self capacitor array, a mutual capacitor array, and any combinations thereof. The variable voltage source 612 can be for example but not limited to $V_{DD1}$, $V_{DD2}$, or $V_{DD3}$, with $V_{DD1}>V_{DD2}>V_{DD3}$.

The transferred-charge-storing capacitive circuit 620 includes a variable transferred-charge-storing capacitor and a third output end, wherein the variable transferred-charge-storing capacitor is used to couple the first input end of the comparator 600 via the third output end to perform a charge transfer procedure, wherein the variable transferred-charge-storing capacitor is implemented with a capacitor selected from a group consisting of a plurality of capacitors of different capacitance values—for example but not limited to C1, C2, and C3 as illustrated in FIG. 6, with C1>C2>C3. The variable transferred-charge-storing capacitor can be located in an integrated circuit or on a printed circuit board.

The reset switch 630 is coupled between the first input end and a reference ground for performing a discharging procedure on the variable transferred-charge-storing capacitor.

The control unit 640 is used to dynamically configure the capacitance value of the variable touch capacitor 611, and a corresponding capacitance value of the variable transferred-charge-storing capacitor. In addition, the control unit 640 is capable of dynamically configuring a corresponding voltage value of the variable reference voltage 601, and a corresponding voltage value of the variable voltage source 612. For example, C1 corresponds to 8×8 electrodes, C2 corresponds to 4×4 electrodes, and C3 corresponds to a single electrode; and ($V_{DD1}$, $V_{th1}$) corresponds to 8×8 electrodes, ($V_{DD2}$, $V_{th2}$) corresponds to 4×4 electrodes, and ($V_{DD2}$, $V_{th3}$) corresponds to a single electrode.

Based on the design mentioned above, the touch module having a dynamic capacitance matching mechanism of the present invention can therefore dynamically configure an effective area for a touch sensing electrode, a corresponding capacitance value of a transferred-charge-storing capacitor, a corresponding voltage value of a variable voltage source, and a corresponding voltage value of a variable reference voltage to improve sensing efficiency, avoid wasting power, prevent touch detection errors, and increase noise immunity of the touch module to overcome an interference on the touch module caused by a display signal.

Thanks to the novel designs mentioned above, the present invention possesses the following advantages:

1. The touch module having a dynamic capacitance matching mechanism of the present invention is capable of dynamically configuring an effective area for a touch sensing electrode, and a corresponding capacitance of a transferred-charge-storing capacitor, so as to increase sensing efficiency and avoid false touch detections.

2. The touch module having a dynamic capacitance matching mechanism of the present invention is capable of dynamically configuring an effective area for a touch sensing electrode, and a corresponding voltage value of a charging power source, so as to increase sensing efficiency and avoid false touch detections.

3. The touch module having a dynamic capacitance matching mechanism of the present invention is capable of dynamically configuring an effective area for a touch sensing electrode, and a corresponding voltage value of a reference voltage, so as to increase sensing efficiency and avoid false touch detections.

4. The touch module having a dynamic capacitance matching mechanism of the present invention is capable of dynamically configuring an effective area for a touch sensing electrode to increase noise immunity of the touch module.

5. The touch module having a dynamic capacitance matching mechanism of the present invention is capable of dynamically configuring an effective area for a touch sensing electrode to overcome an interference on the touch module caused by a display signal.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A touch module having a dynamic capacitance matching mechanism, comprising:
a comparator, having a first input end, a second input end, and an output end, wherein said second input end is coupled with a reference voltage;
a touch capacitive circuit, having a variable touch capacitor, a voltage source, and a second output end, wherein said voltage source is used to perform a charging procedure on said variable touch capacitor, and said variable touch capacitor is coupled to said first input end of said comparator via said second output end after said charging procedure, wherein the variable touch capacitor capacitance is switchable among different equivalent capacitance values formed by interconnection of basic touch sensing capacitors;
a transferred-charge-storing capacitive circuit, having a variable transferred-charge-storing capacitor and a third output end, wherein said variable transferred-charge-storing capacitor is used to couple with said first input end of said comparator via said third output end to perform a charge transfer procedure and wherein said transferred-charge-storing capacitor is implemented with a capacitor selected from a group consisting of a plurality of capacitors of different capacitance values determined according to a capacitance value of said variable touch capacitor, and wherein the capacitance value of said variable transferred-charge-storing capacitor is determined according to a value of said variable touch capacitor provided by a capacitor selected from capacitors of different capacitance values in response to a capacitance value of said variable touch capacitor; and
a reset switch, coupled between said first input end and a reference ground for performing a discharging procedure on said variable transferred-charge-storing capacitor.

2. The touch module having a dynamic capacitance matching mechanism as claim 1, further comprising a control unit to dynamically configure a capacitance value of said variable touch capacitor, and a corresponding capacitance value of said variable transferred-charge-storing capacitor.

3. The touch module having a dynamic capacitance matching mechanism as claim 1, wherein said variable touch capacitor is formed by a subset of a plurality of capacitors included in a touch capacitor array.

4. The touch module having a dynamic capacitance matching mechanism as claim 3, wherein said touch capacitor array is a capacitor array selected from a group consisting of a self capacitor array comprising a plurality of capacitors formed from a plurality of separate electrodes and a mutual capacitor array comprising a plurality of capacitors each formed by two separate electrodes, and any combinations thereof.

5. The touch module having a dynamic capacitance matching mechanism as claim 1, wherein said variable transferred-charge-storing capacitor is implemented by a capacitor selected from a group consisting of a plurality of capacitors of different capacitance values.

6. The touch module having a dynamic capacitance matching mechanism as claim 1, wherein said variable transferred-charge-storing capacitor is located in an integrated circuit.

7. The touch module having a dynamic capacitance matching mechanism as claim 1, wherein said variable transferred-charge-storing capacitor is located on a printed circuit board.

8. A touch module having a dynamic capacitance matching mechanism, comprising:
- a comparator, having a first input end, a second input end, and an output end, wherein said second input end is coupled with a variable reference voltage;
- a touch capacitive circuit, comprising a variable touch capacitor, a voltage source, and a second output end, wherein said voltage source is used to perform a charging procedure on said variable touch capacitor, and said variable touch capacitor is coupled with said first input end of said comparator via said second output end after said charging procedure, wherein said variable touch capacitor is formed by a subset of a plurality of capacitors included in a touch capacitor array;
- a transferred-charge-storing capacitive circuit, comprising a variable transferred-charge-storing capacitor and a third output end, wherein said variable transferred-charge-storing capacitor is used to couple said first input end of said comparator via said third output end to perform a charge transfer procedure, and said variable transferred-charge-storing capacitor is implemented with a capacitor selected from a group consisting of a plurality of capacitors of different capacitance values, and a capacitance value of said variable transferred-charge-storing capacitor is determined according to a capacitance value of said variable touch capacitor; and
- a reset switch, coupled between said first input end and a reference ground for performing a discharging procedure on said variable transferred-charge-storing capacitor.

9. The touch module having a dynamic capacitance matching mechanism as claim 8, further comprising a control unit for dynamically configuring a capacitance value of said variable touch capacitor, and a corresponding capacitance value of said variable transferred-charge-storing capacitor.

10. The touch module having a dynamic capacitance matching mechanism as claim 9, wherein said control unit further has a function of dynamically determining a voltage value of said variable reference voltage.

11. The touch module having a dynamic capacitance matching mechanism as claim 8, wherein said touch capacitor array is a capacitor array selected from a group consisting of a self capacitor array comprising a plurality of capacitors formed from a plurality of separate electrodes and a mutual capacitor array comprising a plurality of capacitors each formed by two separate electrodes, and any combinations thereof.

12. The touch module having a dynamic capacitance matching mechanism as claim 8, wherein said variable transferred-charge-storing capacitor is located in an integrated circuit.

13. The touch module having a dynamic capacitance matching mechanism as claim 8, wherein said variable transferred-charge-storing capacitor is located on a printed circuit board.

14. A touch module having a dynamic capacitance matching mechanism, comprising: a comparator, having a first input end, a second input end, and an output end, wherein said second input end is coupled with a variable reference voltage; a touch capacitive circuit, comprising a variable touch capacitor, a variable voltage source, and a second output end, wherein said variable voltage source is used to perform a charging procedure on said variable touch capacitor, and said variable touch capacitor is coupled with said first input end of said comparator via said second output end after said charging procedure, wherein said variable touch capacitor is formed by a subset of a plurality of capacitors included in a touch capacitor array; a transferred-charge-storing capacitive circuit, comprising a variable transferred-charge-storing capacitor and a third output end, wherein said variable transferred-charge-storing capacitor is used to couple said first input end of said comparator via said third output end to perform a charge transfer procedure, and said variable transferred-charge-storing capacitor is implemented with a capacitor selected from a group consisting of a plurality of capacitors of different capacitance values and a capacitance value of said variable transferred-charge-storing capacitor is determined according to a capacitance value of said variable touch capacitor; a reset switch, coupled between said first input end and a reference ground for performing a discharging procedure on said variable transferred-charge-storing capacitor; and a control unit, used to dynamically configure a capacitance value of said variable touch capacitor, and a corresponding capacitance value of said variable transferred-charge-storing capacitor.

15. The touch module having a dynamic capacitance matching mechanism as claim 14, wherein said control unit further has a function of dynamically determining a voltage value of said variable reference voltage and a voltage value of said variable voltage source.

16. The touch module having a dynamic capacitance matching mechanism as claim 14, wherein said variable transferred-charge-storing capacitor is located in an integrated circuit or on a printed circuit board.

* * * * *